US008740159B2

(12) United States Patent
Braun

(10) Patent No.: US 8,740,159 B2
(45) Date of Patent: Jun. 3, 2014

(54) LID HOLDER FOR A SLOW COOKER

(76) Inventor: Vicky S. Braun, St. Peters, MO (US)

( * ) Notice: Subject to any disclaimer, the term of this patent is extended or adjusted under 35 U.S.C. 154(b) by 260 days.

(21) Appl. No.: 12/843,007

(22) Filed: Jul. 24, 2010

(65) Prior Publication Data

US 2011/0260023 A1    Oct. 27, 2011

Related U.S. Application Data

(60) Provisional application No. 61/271,689, filed on Jul. 24, 2009.

(51) Int. Cl.
*F16M 11/00* (2006.01)

(52) U.S. Cl.
USPC ................. 248/176.2; 248/37.6; 248/213.2; 211/41.11; 220/744

(58) Field of Classification Search
USPC ................. 248/220.21, 176.2, 37.6, 231.81; 211/41.11; 220/744, 735
See application file for complete search history.

(56) References Cited

U.S. PATENT DOCUMENTS

| | | | |
|---|---|---|---|
| 746,878 A | 12/1903 | Reichelt | |
| 807,840 A | 12/1905 | Martin et al. | |
| 1,305,777 A | 6/1919 | Cunningham | |
| 1,390,766 A * | 9/1921 | Cunningham | 220/744 |
| 1,928,995 A | 10/1933 | De Biasi | |
| D113,402 S * | 2/1939 | Schram | D3/266 |
| 2,286,012 A | 6/1942 | Rochow | |
| 2,541,604 A | 2/1951 | Normandin | |
| 2,705,657 A | 4/1955 | Di Giorgio | |
| 3,163,385 A | 12/1964 | Lazan, Jr. | |
| 3,282,437 A * | 11/1966 | Hansen | 211/41.7 |
| 3,326,387 A * | 6/1967 | Princevalle | 211/41.11 |
| 3,407,429 A * | 10/1968 | Di Nardo | 15/257.01 |
| 3,641,616 A * | 2/1972 | Bonci | 15/257.06 |
| 4,183,444 A * | 1/1980 | English et al. | 220/200 |
| 4,205,411 A * | 6/1980 | Cupp et al. | 15/257.06 |
| D266,461 S * | 10/1982 | Helzer | D6/310 |
| 4,364,537 A * | 12/1982 | Helzer | 248/448 |
| D276,961 S * | 1/1985 | Kemper | D6/466 |
| D286,485 S * | 11/1986 | Frizzell | D6/573 |
| 4,773,555 A * | 9/1988 | Merino | 220/379 |
| 4,790,503 A | 12/1988 | Pohler | |
| 4,850,556 A * | 7/1989 | Otani et al. | 248/206.2 |
| 5,242,060 A * | 9/1993 | Chiang et al. | 211/41.11 |
| D340,622 S * | 10/1993 | Park et al. | D7/620 |
| D358,914 S * | 5/1995 | Masse et al. | D32/54 |
| D379,903 S * | 6/1997 | Durham | D7/601 |
| 5,683,010 A | 11/1997 | Boyajian, Jr. | |
| 5,730,405 A * | 3/1998 | Nichols, IV | 248/213.2 |
| 5,836,043 A * | 11/1998 | Rovas | 15/257.06 |

(Continued)

OTHER PUBLICATIONS

Hamilton Beach 7 Quart Slow Cooker with Lid Rest; http://WWW.farmandfleet.com/products/308355-7_quart_slow-cook . . . , 2 pages, printed from the Internet on May 7, 2010.

*Primary Examiner* — Terrell McKinnon
*Assistant Examiner* — Daniel Breslin
(74) *Attorney, Agent, or Firm* — Grace J. Fishel

(57) ABSTRACT

A lid holder for use with a slow cooker. The lid holder has a tray supported on a strap from the rim of the slow cooker. The tray has inner and outer walls between which a lid from the cooker may be interposed. The lid is supported in the tray above a well for drips on fins between the inner and outer walls.

5 Claims, 5 Drawing Sheets

(56) References Cited

U.S. PATENT DOCUMENTS

| | | | |
|---|---|---|---|
| 5,857,601 A * | 1/1999 | Greenwood | 224/409 |
| D408,229 S * | 4/1999 | Hong | D7/638 |
| 5,979,673 A | 11/1999 | Dooley | |
| D419,736 S * | 1/2000 | Clark | D32/53.1 |
| D419,737 S * | 1/2000 | Searcy | D32/54 |
| 6,012,593 A * | 1/2000 | Knittel et al. | 211/41.11 |
| 6,237,802 B1 * | 5/2001 | Douglas | 220/736 |
| 6,446,829 B1 * | 9/2002 | Malvasio et al. | 220/697 |
| D485,307 S * | 1/2004 | Sheldon et al. | D19/90 |
| 7,025,312 B1 * | 4/2006 | Dare | 248/176.1 |
| D520,286 S * | 5/2006 | Chen et al. | D6/553 |
| D530,570 S * | 10/2006 | Krueger | D7/601 |
| 7,185,864 B2 * | 3/2007 | Adams | 248/301 |
| D546,129 S * | 7/2007 | Sergianni | D7/601 |
| D547,235 S * | 7/2007 | Stanton et al. | D11/156 |
| 7,284,733 B2 * | 10/2007 | Parenteau | 248/213.2 |
| 7,419,129 B2 * | 9/2008 | Kixmoeller | 248/488 |
| D586,969 S * | 2/2009 | Graham | D32/54 |
| 7,485,831 B2 | 2/2009 | Tynes et al. | |
| D592,434 S * | 5/2009 | Thompson et al. | D6/553 |
| 7,673,759 B2 * | 3/2010 | Stukenberg | 211/41.7 |
| D618,958 S * | 7/2010 | Di Lollo | D7/388 |
| D633,717 S * | 3/2011 | Searcy | D3/310 |
| 7,947,928 B2 * | 5/2011 | Tynes et al. | 219/433 |
| 8,091,845 B2 * | 1/2012 | Di Lollo | 248/213.2 |
| 8,479,926 B1 * | 7/2013 | Blaisdell | 211/41.11 |
| D688,044 S * | 8/2013 | Brunner | D3/304 |
| D689,045 S * | 9/2013 | Mardas | D14/253 |
| 2006/0186124 A1 | 8/2006 | Sergianni | |
| 2007/0075204 A1 * | 4/2007 | Fertil | 248/309.1 |
| 2010/0193523 A1 * | 8/2010 | Beisheim | 220/379 |

* cited by examiner

LID HOLDER FOR A SLOW COOKER

This application claims priority from provisional application Ser. No. 61/271,689, filed Jul. 24, 2009, for Lid Solution (Lid Holder).

BACKGROUND OF THE INVENTION

1. Field of the Invention The present invention relates to lid holder for universal use with most slow cookers.

2. Brief Description of the Prior Art

Slow cookers are a great cooking tool for families that are always on the go, potlucks and other social meals.

To access the food in a slow cooker during cooking or for plating the food, the lid must be removed. When the lid is removed, it is common practice to put it on the counter or table top on which the cooker is placed. This is a problem. Additionally, food splashed on the lid and condensed steam are deposited on the surface supporting the cooker. Aside from the problem of cleaning up the food or condensation, a hot lid can cause permanent damage to a counter top, table or other supporting surface.

Hamilton Beach Brands, Inc. has a slow cooker with a lid rest that supports the lid over the cooker in a manner that drips are directed back into the cooker where they may water down the food. The lid rest is adapted for use with only that particular slow cooker. Another Hamilton Beach slow cooker is described in U.S. Pat. No. 7,485,831. In that instance, the lid is hung on the outside of the cooker with drips falling on the supporting surface. The lid rest in the '831 patent is also for use with only that slow cooker.

What is needed is a hands free lid holder that can be used with any slow cooker and, unlike the Hamilton Beach models, neither directs drips back into the cooker nor onto the supporting surface while saving counter space.

BRIEF SUMMARY OF THE INVENTION

In view of the above, it is an object of the present invention to provide a lid holder which can be used with most slow cookers. It is another object to provide a lid holder that does not use up counter space and keeps the lid handy and hands free. It is also an object to provide a lid holder that supports a hot lid in a manner that liquid flowing off the lid does not drip onto the support surface or water down the food stuffs. Other objects and features of the invention will be in part apparent and in part pointed out hereinafter.

In accordance with the invention, a lid holder for a slow cooker has a tray supported on a strap from a rim of a container in the slow cooker. The rim of the container has an inner ledge and a lid for the container is sized and shaped to fit within the rim and when seated on the inner ledge cover the container with a gap between the lid and the rim for escape of vapors.

The tray has an inner and an outer wall between which a portion of the lid is capable of being interposed. The inner and outer walls are joined along a lower edge by a base in which a well is formed as a catch reservoir for liquids coming off the lid. A plurality of fins are provided between the inner and outer walls for supporting the lid above the well.

The strap is attached to the inner wall at a lower end and is bent at its upper end to form a leg adapted to span the rim between the ledge and outer periphery of the rim of the container. The leg is bent to form a flange adapted to be received in the gap between the lid and the rim. The strap has length such that the tray is support above the surface upon which the slow cooker is placed.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
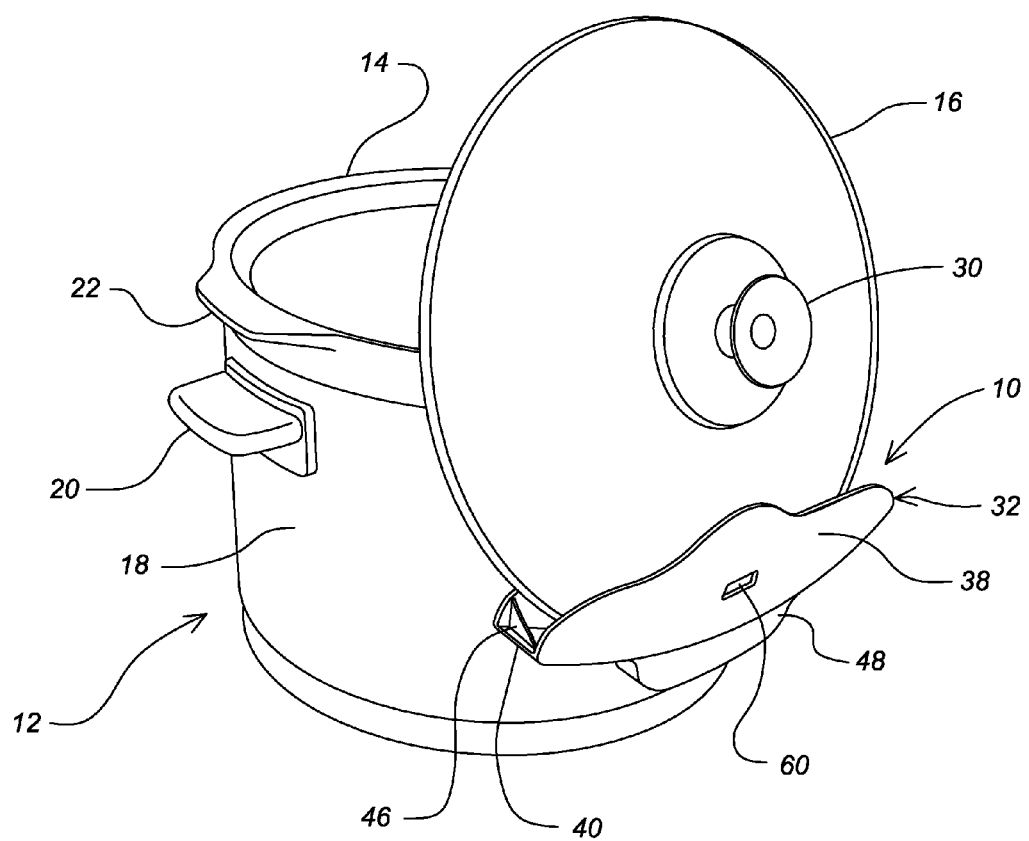
FIG. 1 is a perspective view showing a lid holder in accordance with the present invention in use on a slow cooker with the lid stowed in the lid holder.

Referring to the drawings more particularly by reference character, a hands free lid holder 10 is shown for use with a slow cooker 12 such as are commonly available and sold by various companies. Typically such slow cookers 12 have a ceramic or stoneware container 14 with a domed lid 16 received in a metal housing 18. Housing 18 has an electrically operated control and heating element (not shown) for heating food stuffs placed in container 14. Housing 18 generally has handles 20 extending therefrom for easily picking up and moving slow cooker 12. Container 14 also may have handles 22 for removing container 14 from housing 18 when the container is removable. While a circular shape in plan view is shown in the drawings for container 14, it is within the spirit and scope of the present invention that container 14 have a different shape, such as, but not limited to oval.

Container 14 has a hollow interior and a rim 24 with an inner ledge 26 (see FIG. 8) for accessing the interior of the container. Lid 16 is sized and shaped to fit within rim 24 and when seated on inner ledge 26 cover container 14 with a gap 28 between lid 16 and rim 24 to permit the release of vapor as foods cooked in a slow cooker typically have a significant water content. Lid 16 may be made of glass or of a different, preferably transparent or translucent material, such as a polymeric material, for instance. Lid 16 preferably includes a handle 30 affixed to the lid via a suitable fastener.

Figure 6:
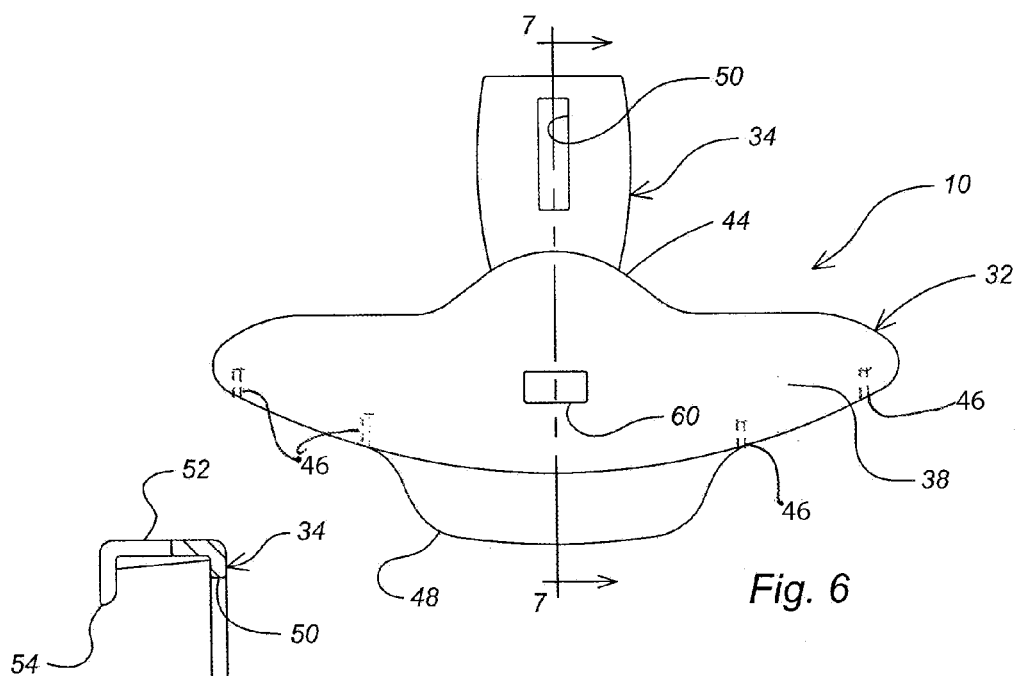
FIG. 6 is a front elevation of the lid holder.
Figure 7:
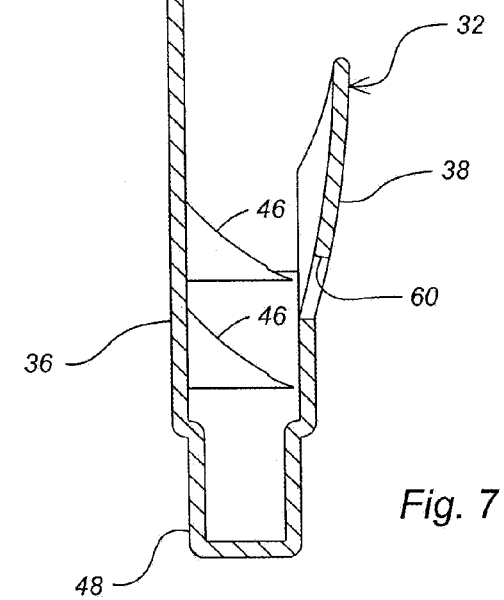
FIG. 7 is a sectional view taken along the plane of 6-6 in FIG. 6.
Figure 8:
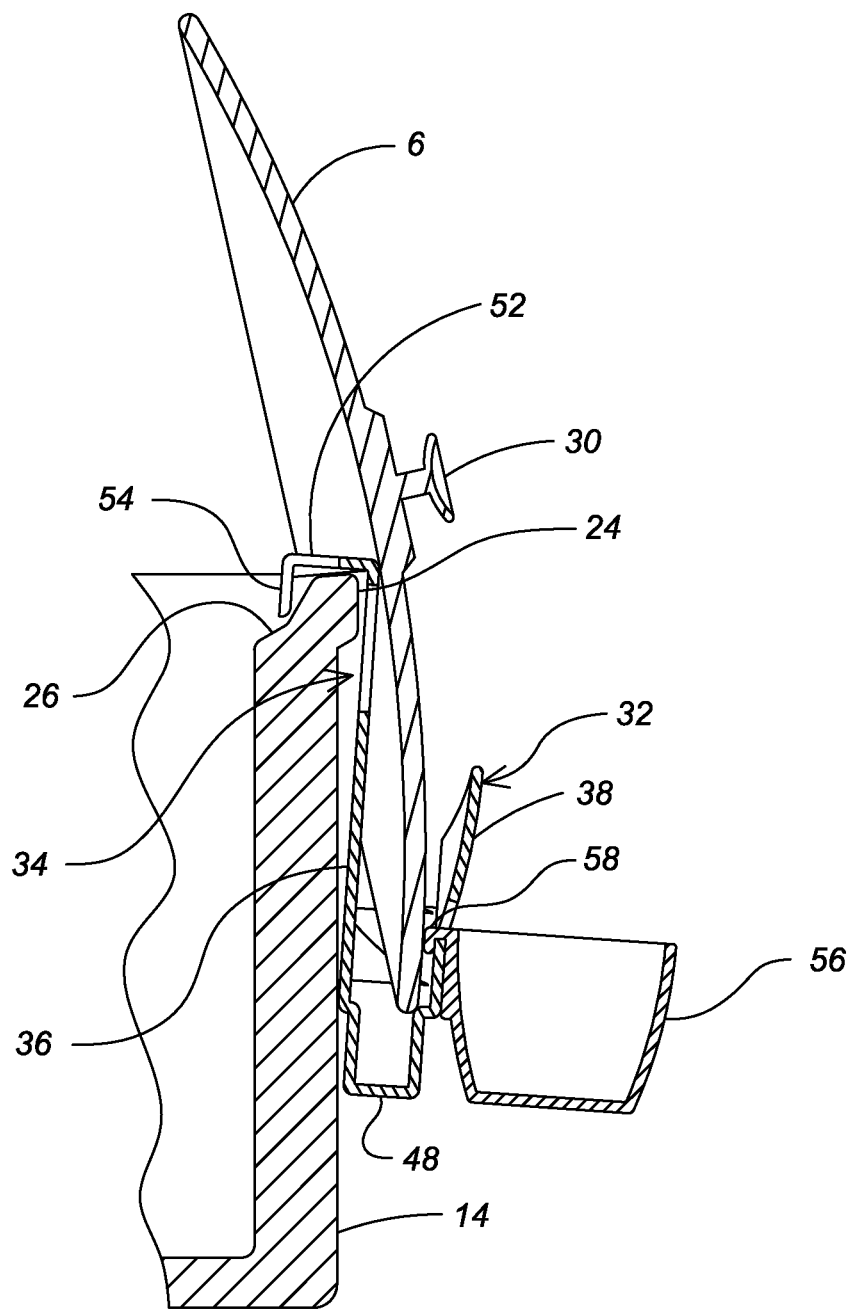
FIG. 8 is a sectional view taken along the plane of 8-8 in FIG. 2.

Lid holder 10 is for use with slow cookers 12 as described above and includes a tray 32 supported on a strap 34. As best seen in FIGS. 7 and 8, tray 32 has an inner 36 and an outer wall 38 between which at least a portion of lid 16 is capable of being interposed. Inner and outer walls 36, 38 are generally parallel and are joined along a lower edge by a base 40. Inner and outer walls 36, 38 are generally arcuate in shape (see FIG. 6) and outer wall 38 is slightly curved to conform to the dome of lid 16 (see FIG. 8). Outer wall 38 extends about half way the distance between base 40 and an upper edge 42 of inner wall 36 so that handle 30 of lid 16 is easily accessible (see FIG. 8) and includes an upwardly extending lobe 44 (FIG. 6) which serves as a backstop to support lid 16.

As shown in FIG. 8, a plurality of fins 46 extend between inner and outer walls 36, 38. In the form illustrated, fins 46 are right-angle triangles in plan and are attached to inner wall 36. Fins 46 are angled downwardly from inner wall 36 for obliquely supporting lid 16 and tipping lid 16 towards rim 24 of container 14. A well 48 is formed in base 40 as a catch reservoir for collecting condensation or liquid that runs downwardly off lid 16 when lid 16 is positioned on fins 46 above well 48.

Tray 32 is supported by strap 34 as follows: Strap 34 has an upper and a lower end. Lower end of strap 34 is attached to upper edge 42 of inner wall 36 at about centerline of tray 32. Strap 34 may include an elongated aperture 50 for appearance or to conserve on material. Upper end of strap 34 is bent at a first right angle to form a leg 52 of sufficient length to bridge rim 24 between ledge 26 and an outer periphery of rim 24 on most slow cookers 12. Leg 52 is bent at a second right angle to form a flange which may be bifurcated into fingers 54 as shown for point contact support. Fingers 54 are adapted to be received in gap 28 between lid 16 and rim 24. Strap 34 has a length such that tray 32 is supported above a surface upon which slow cooker 12 is placed with the inside of the domed portion of lid 16 tipped against rim 24 of container 14.

Figure 2:
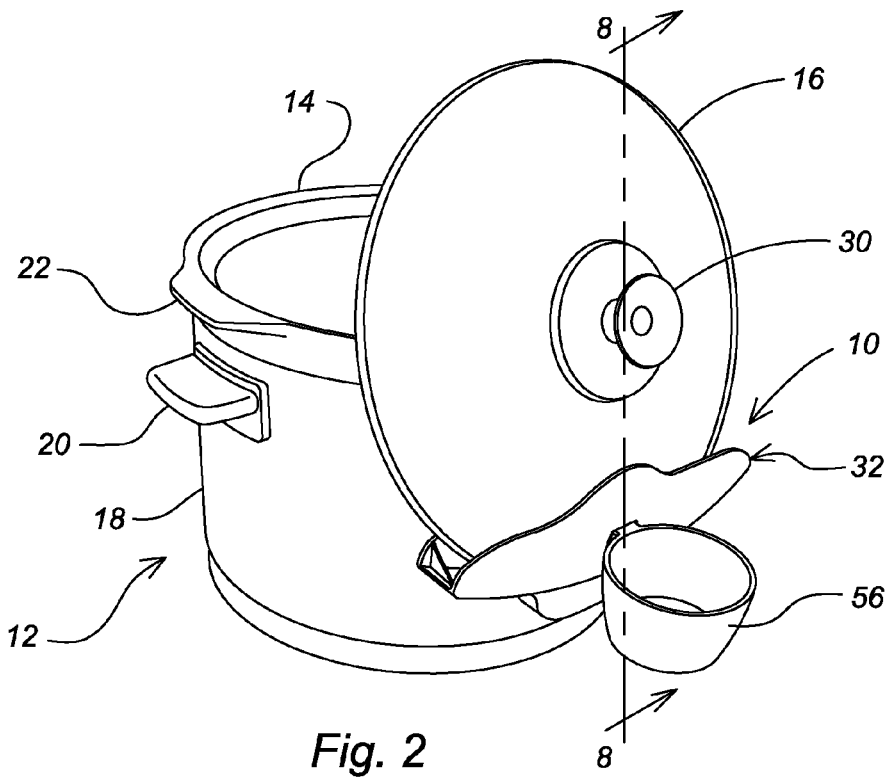
FIG. 2 is a view like FIG. 1 but additionally showing a cup for a serving utensil attached to the lid holder.
Figure 3:
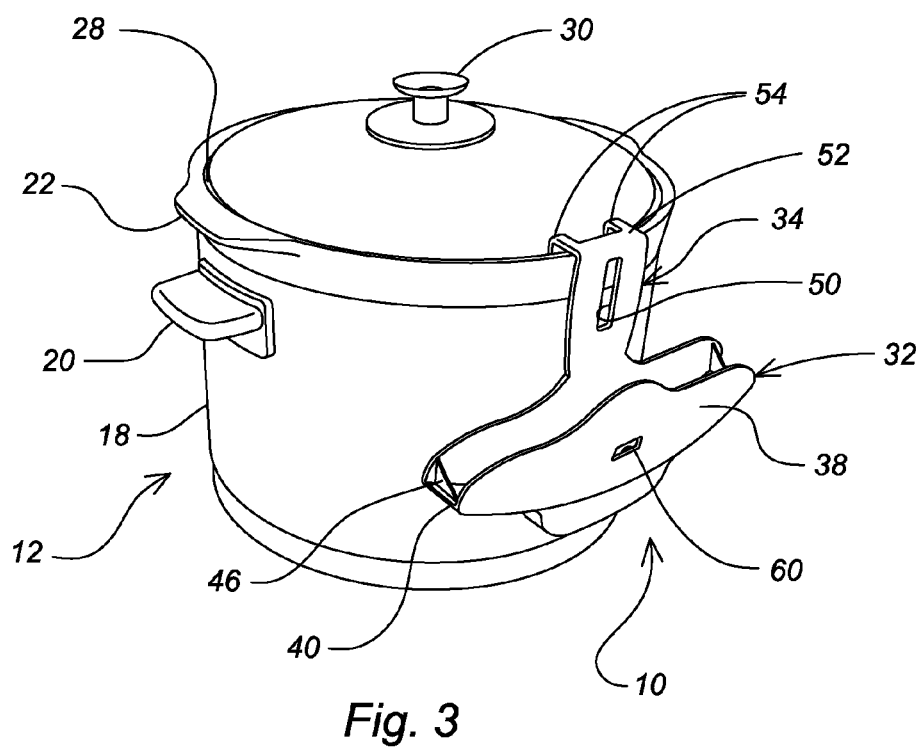
FIG. 3 is a view like FIG. 1 but with the lid reinstalled on a container in the slow cooker.
Figure 4:
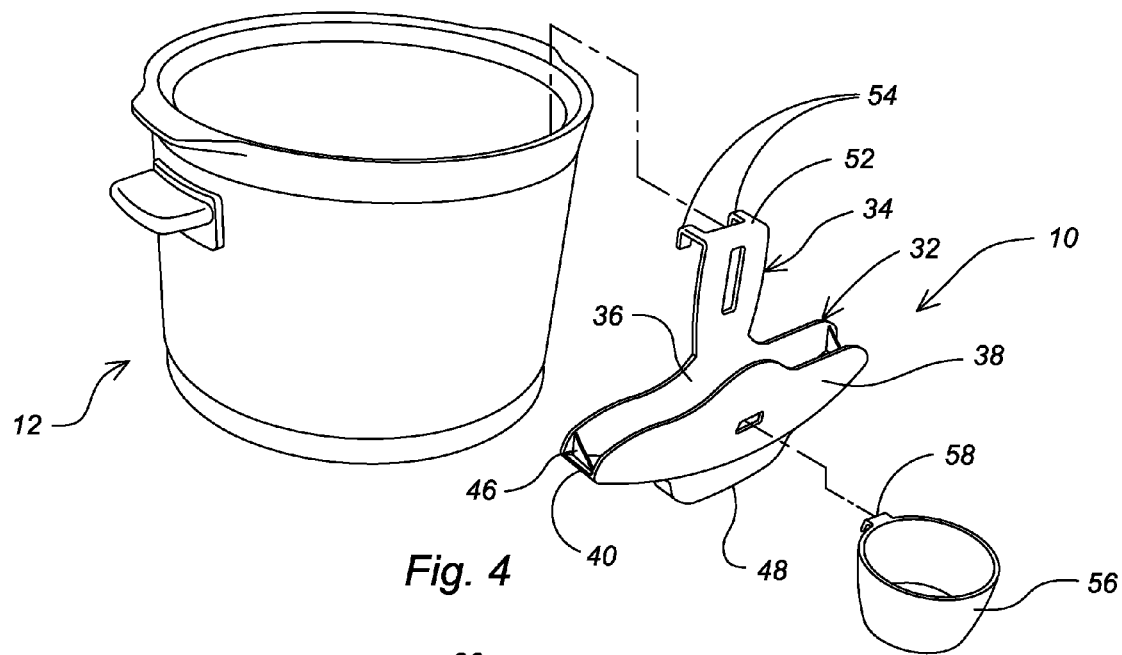
FIG. 4 is an exploded view like FIG. 2.
Figure 5:
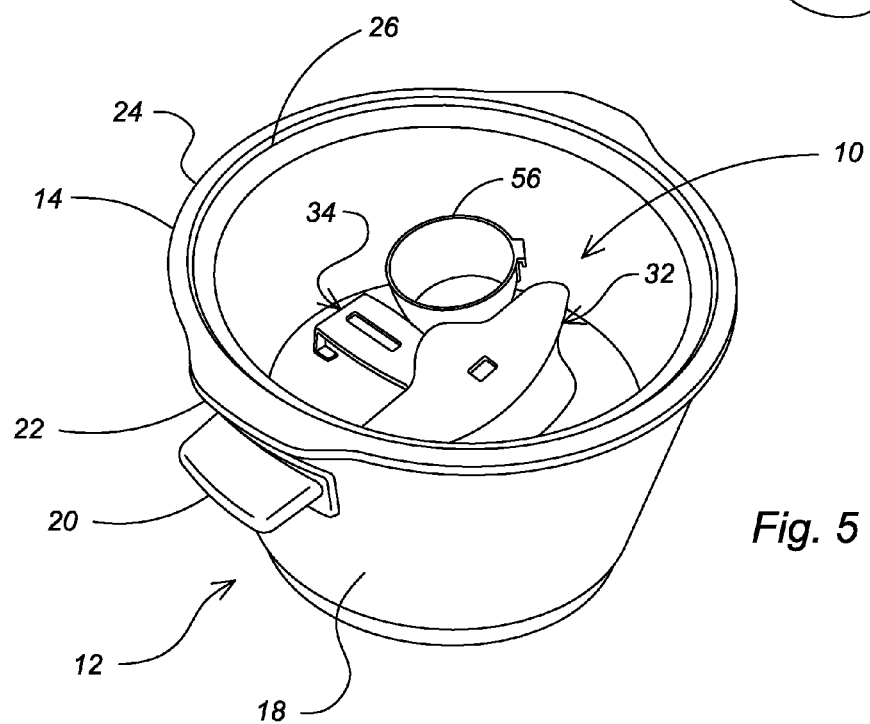
FIG. 5 is a perspective view showing the lid holder and cup stowed in the slow cooker.

In addition to providing a hands free support for lid 16, lid holder 10 may also include a cup 56 for a utensil for manipulating food stuffs within container 14. Such utensils usually include a large serving spoon or ladle, although the utensil could also be a fork, spatula or the like. As seen in FIGS. 2, 4 and 8, cup 56 includes a handle 58 which may be latched into an aperture 60 provided in outer wall 38 of tray 32. Lid holder 10 when detached from container 14 may be stored in the slow cooker along with cup 56 as shown in FIG. 5.

To use the above described lid holder 10, lid holder 10 is removed from container 14 if stored in slow cooker 12 and attached to rim 24 as shown in the drawings. Leg 52 and strap 34 are designed such that lid holder 10 fits the rim of most if not all existing slow cookers 12 with tray 32 above the supporting surface. A hot lid 16 of slow cooker 12 may be removed from container 14, placed between inner and outer walls 36, 38 of tray 32 with any drips from lid 16 caught in well 48, thereby neither dripping upon the support surface nor watering down the food stuffs. Lid holder 10 keeps lid 16 nearby and convenient for reinstallation on container 14 and does not use up counter space either for the lid holder or for the lid. A utensil for stirring or plating food stuffs may be also kept ready at hand when stored in cup 56 thus further keeping the support surface clean and uncluttered.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A lid holder for a slow cooker having a container with a domed lid, the container has a hollow interior and a rim with an inner ledge for accessing the interior of the container and the lid is sized and shaped to fit within the rim and when seated on the inner ledge cover the container with a gap between the lid and the rim, said lid holder comprising:
    a tray suspended on a strap;
    said tray having an inner and an outer wall between which at least a portion of the lid is capable of being interposed, said inner and outer walls joined along a lower edge by a curved base;
    a first and second pair of fins extending between the inner and outer walls for supporting the lid on the fins, said fins angled downwardly from the inner wall for obliquely and freely supporting the lid on the fins and tipping it towards the rim of the container for convenient reinstallation on the container, said fins approaching the outer wall below a top edge of the outer wall; and,
    a well formed in the base as a catch reservoir for liquids, said well positioned below the fins; said first pair of fins flanking the well and said second pair of fins forming end walls on the curved base;
    said strap having an upper and a lower end, said lower end attached to the inner wall and said upper end extending upwards, bending at a first angle to form a leg and bending at a second angle to form a straight flange, said flange adapted to be received in the gap between the lid and the rim and said leg adapted to span the rim between the ledge and an outer periphery of the rim, said strap having a length such that the tray is supported above a surface upon which the slow cooker is placed with the lid tipped against the rim of the container.

2. The lid holder of claim 1 wherein the inner and outer walls are arcuate in shape along the curved base.

3. The lid holder of claim 1 further comprising a cup for a utensil, said cup having a U-shaped handle and said outer wall having an aperture into which the handle of the cup is latched.

4. A lid holder for a slow cooker having a ceramic or stoneware container with a domed lid received in a metal housing, the ceramic or stoneware container has a hollow interior and a rim with an inner ledge for accessing the interior of the container and the lid is sized and shaped to fit within the rim and when seated on the inner ledge cover the container with a gap between the lid and the rim, said lid holder comprising:
    a tray suspended on a strap;
    said tray having an inner and an outer wall between which at least a portion of the lid is capable of being interposed, said walls being generally parallel, arcuate in shape and joined along a lower edge by a curved base, said outer wall extending along the inner wall about half way the distance between the base and an upper edge of the inner wall so that a handle of the lid is easily accessible, said outer wall having a curvature to conform to the dome of the lid;
    a first and second pair of fins extending between the inner and outer walls and attached to the inner wall, said fins angled downwardly from the inner wall for obliquely and freely supporting the lid on the fins and tipping it towards the rim of the container for convenient reinstallation on the container; said fins approaching the outer wall below a top edge of the outer wall; and,
    a well formed in the base as a catch reservoir for liquids, said well positioned below the fins; said first pair of fins flanking the well and said second pair of fins forming end walls on the curved base;
    said strap having an upper and a lower end, said lower end attached to the upper edge of the inner wall and said upper end extending upwards, bending at a first right angle to form a leg and bending at a second right angle to form a straight flange, said flange bifurcated into fingers adapted to be received in the gap between the lid and the rim and said leg adapted to span the rim between the ledge and an outer periphery of the rim, said strap having a length such that the tray is supported above a surface upon which the slow cooker is placed with the lid tipped against the rim of the container.

5. The lid holder of claim 4 wherein the strap is attached to the inner wall on centerline of the tray and wherein the outer wall has a lobe along its upper edge on centerline of the tray.

\* \* \* \* \*